United States Patent [19]
Mori et al.

[11] Patent Number: 5,393,616
[45] Date of Patent: Feb. 28, 1995

[54] METAL HYDRIDE ELECTRODE

[75] Inventors: Hiroyuki Mori; Keiichi Hasegawa; Masaharu Watada; Masahiko Oshitani, all of Takatsuki, Japan

[73] Assignee: Yuasa Corporation, Japan

[21] Appl. No.: 50,025

[22] PCT Filed: Oct. 22, 1991

[86] PCT No.: PCT/JP91/01445
§ 371 Date: Apr. 28, 1993
§ 102(e) Date: Apr. 28, 1993

[87] PCT Pub. No.: WO92/08251
PCT Pub. Date: May 14, 1992

[30] Foreign Application Priority Data

| Oct. 29, 1990 | [JP] | Japan | 2-292565 |
| Oct. 29, 1990 | [JP] | Japan | 2-292566 |
| Oct. 31, 1990 | [JP] | Japan | 2-296736 |
| Oct. 31, 1990 | [JP] | Japan | 2-296737 |
| Oct. 31, 1990 | [JP] | Japan | 2-296738 |
| Nov. 2, 1990 | [JP] | Japan | 2-298617 |
| Nov. 6, 1990 | [JP] | Japan | 2-301835 |
| Nov. 6, 1990 | [JP] | Japan | 2-301836 |

[51] Int. Cl.$^6$ .................. H01M 4/32; H01M 4/38
[52] U.S. Cl. .................. 429/59; 429/223; 420/900
[58] Field of Search ............ 429/59, 223, 218; 420/900

[56] References Cited

U.S. PATENT DOCUMENTS

| 4,396,576 | 8/1983 | Osumi et al. | 420/900 X |
| 4,605,603 | 8/1986 | Kanda et al. | 429/59 |

FOREIGN PATENT DOCUMENTS

| 0142878 | 5/1985 | European Pat. Off. |
| 61-138458 | 6/1986 | Japan |
| 61-138459 | 6/1986 | Japan |
| 61-168866 | 7/1986 | Japan |
| 62-256366 | 11/1987 | Japan |
| 63-110553 | 5/1988 | Japan |
| 1-267955 | 10/1989 | Japan |
| 2-236955 | 9/1990 | Japan |
| 2-256161 | 10/1990 | Japan |

*Primary Examiner*—John S. Maples
*Attorney, Agent, or Firm*—Evenson, McKeown Edwards & Lenahan

[57] ABSTRACT

A metal hydride electrode, in which a metallic cobalt powder is mixed, within a mixing range of 3 to 20 weight percents, with a hydrogen absorbing alloy powder formed by substituting a part of Ni of alloy expressed by a rational formula of MmNi$_5$ with Al and at least one kind of Fe, Cu, Co, Mn, and the mixed powder is loaded in a porous alkaline-proof metal body. An nickel electrode, in which a cobalt monoxide powder is mixed with an active material powder within a mixing range of 5 to 15 weight percents, the active material powder comprising zinc existing within a range of 2 to 8 weight percents, under a solid solution state in a crystal of nickel hydroxide powder assuming a spherical shape including an inner pore volume of 0.14 ml/g or less, and the mixed powder is loaded in a porous alkaline-proof metal body. A nickel-hydrogen battery, in which the foregoing metal hydride electrode and the foregoing nickel electrode are wound with a separator put between them, aqueous solution of potassium hydroxide is filled therein and sealed, and they are maintained under standing condition for 5 hours or more.

10 Claims, 10 Drawing Sheets

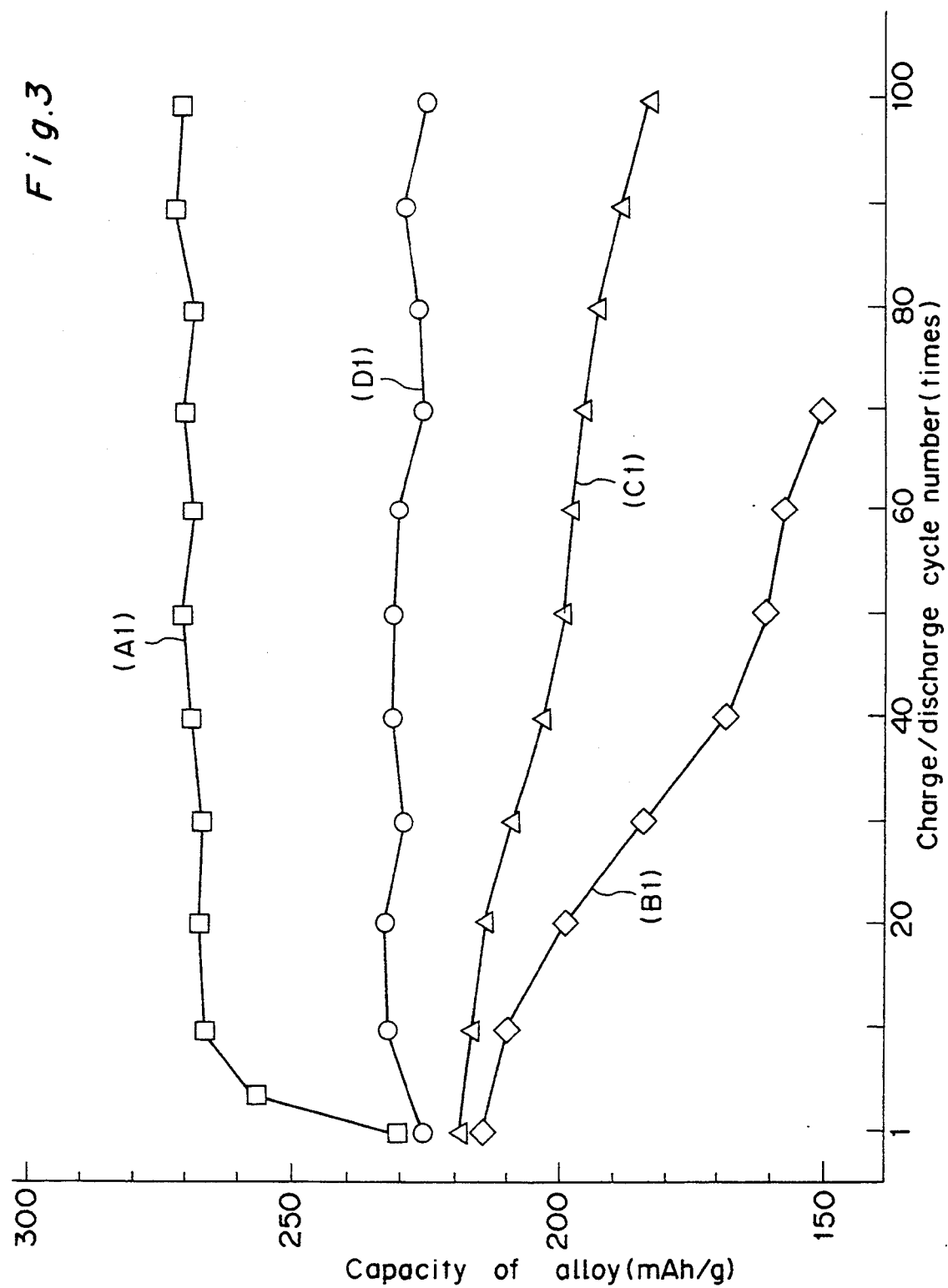

METAL HYDRIDE ELECTRODE

TECHNICAL FIELD

This invention relates to a metal hydride electrode having excellent charging and discharging ability etc., a nickel electrode having a high energy density and including no cadmium, and a nickel-hydrogen battery which is inexpensive and free from pollution.

BACKGROUND ART

With a recent progress of portable electric equipment, demands for improving a capacity and enhancing an energy density are increasing against batteries serving as its power sources. In order to meet these demands, a nickel-metal hydride battery so-called "nickel-hydrogen battery" which utilizes $MmNi_5$ system (Mm: misch metal comprising a mixture of rare earth elements such as La, Ce or Nd etc.) hydrogen absorbing alloy as its negative active material, makes its advent recently and is expected to be put in practical use.

In the negative electrode (metal hydride electrode) of nickel-hydrogen battery utilizing alkaline electrolyte, the reactions expressed by equations (1) and (2) take place at time of charging and discharging.

  (1)

  (2)

(M: hydrogen absorbing alloy)

An electron is supplied from outside to cause a proton to be reduced to a hydrogen atom on a surface of alloy and absorbed in the hydrogen absorbing alloy when the charging is carried out. On the contrary, the absorbed hydrogen atom is ionized on the surface of alloy to release the proton when the discharging is carried out.

In the charge/discharge reaction of the metal hydride electrode, as described above, the alloy surface on which the ionization reaction (or reverse reaction) of hydrogen atom expressed by the equation (1) takes place plays an important part.

However, when charging and discharging (oxidation and reduction) are repeated in the alkaline electrolyte, the $MmNi_5$ system hydrogen absorbing alloy has such problems that surface corrosion of alloy progresses so as to inhibit the foregoing ionization reaction of hydrogen atom, increase a resistance between alloy particles (decrease an electronic conductivity) and gradually decrease the capacity to exhaust its service life.

In addition to the above problems, a sealed type nickel-hydrogen battery further includes such a problem that the hydrogen absorbing alloy of negative electrode is oxidized by oxygen gas generated from the positive electrode at time of over-charging, so that deterioration of alloy and shortening of service life are further accelerated.

In order to avoid the deterioration of alloy and shortening of service life due to the corrosion or oxidation of hydrogen absorbing alloy, there has so far been used a method for improving the corrosion resistance of the alloy itself by substituting a composition of $MmNi_5$ system alloy i.e. a part of Ni with Al and Fe, Cu, Mn or Co etc. In order to further improve the corrosion resistance and oxidation resistance because of imperfection of this method, there have been proposed methods called as "microencapsulation method" in which corrosion resistant metal such as nickel or copper is coated on surfaces of hydrogen absorbing alloy (Published Patent Application (KOKAI) Nos. 61-64069 & 63-51051) and a method in which conductive agent of metallic powder or metal oxide is mixed in the hydrogen absorbing alloy in order to improve the electron conductivity between alloy particles, etc.

Although these methods have some effect to avoid the deterioration of alloy, a manufacturing cost is increased because they require troublesome processes such as the alkaline etching or the electroless plating and a capacity per unit weight of active material is decreased because a percentage of plating amount or amount of conductive agent is large which is unnecessary for the electrochemical capacity.

The electroless plating process for the microencapsulation of hydrogen absorbing alloy is composed of plural processes such as [1] Pretreatment of alloy, [2] Electroless plating, [3] Washing and [4] Drying etc. so that this process is troublesome and expensive in its manufacturing cost. In addition, heavy metal is included in waste liquid after the electroless plating so that pollution control facilities become necessary to cause an increase in the manufacturing cost. Further, in quality, it is difficult to control a plating amount and an uniformity of plating. Moreover, it is required to coat nickel or copper of at least 20 weight percents or more in order to effectively control the deterioration of hydrogen absorbing alloy by means of the microencapsulation method, so that a volume per unit weight of active material of negative electrode comprising the hydrogen absorbing alloy is minimized.

The alkaline etching process also includes troublesome problems similar to those of the microencapsulation method such as [1] Immersion in high-temperature alkaline liquid, [2] Washing for removing alkaline, and [3] Drying etc.

On the other hand, the method using the conductive agent is simple in manufacture and inexpensive in cost because the manufacturing process consists only of mixing the conductive agent into the alloy powder. However, 20 to 40 weight percents of conductive agent must be added in order to restrict the decrease in capacity of alloy, so that the same problem as above arises wherein the capacity per unit weight of active material becomes small. A conductive agent effective for maintaining the electronic conductivity between alloy particles for a long period is not found yet.

In order to put the nickel-hydrogen battery having a large capacity into practical use, it is required to increase an energy density of the nickel hydroxide electrode serving as the positive electrode. A sintered type plate has hitherto been used mainly for the nickel electrode. An upper limit of the energy density has been 400mAh/cc, and it has been hard to increase the capacity beyond this limit. Recently, there has been developed a so-called pasted type nickel electrode in which nickel hydroxide powder forming an active material has been loaded in a metallic porous substrate having a high porosity, and its energy density has been improved up to approx. 500 mAh/cc.

In the conventional pasted type nickel electrode, however, it is indispensable to add a small quantity of cadmium to the nickel hydroxide powder forming the active material, in order to prevent swelling of electrode leading to a short-circuiting and a decrease in service life of battery. On the contrary, it is required to put the nickel-hydrogen battery, which does not include cadmium at all, into practical use in consideration of the environmental problem. Further, since the conventional nickel hydroxide powder is porous substance including a number of inner pores of particle, the battery capacity can not be increased up to 125% of that of conventional sintered type battery so far as the nickel hydroxide powder of such type including a number of inner pores of particle is used for the positive active material. Therefore, the conventional pasted type nickel electrode has included a problem to be solved from a standpoint of loading to a further high density.

The nickel-hydrogen battery using the foregoing conventional pasted type nickel electrode (including cadmium) and the metal hydride electrode have been unable to be formed into the complete pollution-free battery including no cadmium and have been expensive in manufacturing cost because they have been troublesome in manufacturing method.

The present invention is made in order to solve the above problems included in the prior arts, and a first object of this invention is to provide a metal hydride electrode which prevents a decrease in capacity of hydrogen absorbing alloy, is simple in manufacturing process and inexpensive in manufacturing cost, and is excellent in charging and discharging performance.

A second object of this invention is to provide a nickel electrode which includes no cadmium and has a high energy density.

A third object of this invention is to provide a nickel-hydrogen battery which is simple in manufacturing process and inexpensive in manufacturing cost, is completely free from pollution, and has a high energy density.

Disclosure of the Invention

The present invention provides a metal hydride electrode, in which metallic cobalt powder is mixed, within a mixing range of 3 to 20 weight percents, to hydrogen absorbing alloy powder formed by substituting a part of Ni of alloy expressed by a rational formula of MmNi$_5$ with Al and at least one kind of Fe, Cu, Co, Mn, and the mixed powder is loaded in a porous alkaline-proof metal body. Further, in place of mixing the metallic cobalt powder, [1] Metallic copper powder is mixed within a mixing range of 5 to 10 weight percents and metallic cobalt powder is mixed within a mixing range of 3 to 10 weight percents. [2] Surfaces of the hydrogen absorbing alloy powder are coated with metallic nickel within a range of 1 to 10 weight percents and matallic cobalt powder is mixed to the alloy powder within a mixing range of 3 to 10 weight percents. [3] Metallic nickel powder is mixed within a mixing range of 5 to 10 weight percents and metallic cobalt powder is mixed within a mixing range of 3 to 10 weight percents.

The nickel electrode of this invention is produced by mixing cobalt monoxide powder to active material powder of nickel electrode within a mixing range of 5 to 15 weight percents. The active material powder comprises zinc existing in a solid solution state, within a range of 2 to 8 weight percents, in a crystal of nickel hydroxide powder assuming a spherical shape including an inside pore volume of 0.14 ml/g or less. The mixed powder is loaded in a porous alkaline-proof metal body.

The nickel-hydrogen battery of this invention is produced by winding the above nickel electrode and the above metal hydride electrode, which is formed by mixing the metallic cobalt powder to the above hydrogen absorbing alloy powder within a mixing range of 3 to 20 weight percents, with a separator put between them. Aqueous solution of potassium hydroxide is loaded therein and sealed, and they are maintained under standing condition for 5 hours or more.

In the metal hydride electrode of the present invention, cobalt is a transition metal including 3d-orbital and operates as an ionization catalyst for hydrogen in the metal hydride electrode. At the same time, cobalt is active to increase the capacity of electrode according to repeated charging and discharging and to form a conductive network between hydrogen absorbing alloy particles or between the alloy and the current collectors, so as to improve the electronic conductivity. Consequently, the electrode added with cobalt is increased in its capacity and elongated in its cycle life.

Because of a very excellent electronic conductivity, copper is active to lower the reaction overvoltage in discharge process and to improve the discharge characteristic. When copper is used together with cobalt, the decrease in capacity can be prevented with an addition smaller than conventional one by synergetic effect so that it becomes possible to obtain a metal hydride electrode having a large electrochemical capacity per unit weight of active material. Further, since the manufacturing process consists only of the mixing process of metallic cobalt powder with metallic copper powder, troublesome manufacturing processes such as the conventional microencapsulation process are not required so that the process can be simplified.

When surfaces of the hydrogen absorbing alloy are coated with nickel, the oxidation resistance of alloy is improved and the reaction overvoltage in discharge process is lowered. A required nickel coating amount is smaller than conventional one owing to the combined use with cobalt so that it becomes possible to obtain a metal hydride electrode having a large electrochemical capacity per unit weight of active material.

Nickel is active to lower the reaction overvoltage in discharge process so as to ease the ionization reaction expressed by the equation (1). When nickel is used together with cobalt, the same effect as the copper can be achieved.

In the nickel electrode of the present invention, spherical and high-density nickel hydroxide powder which is controlled in its development of inside pore as compared with conventional powder, is used as the positive active material, so that the loading density of active material becomes large. Further, since cobalt monoxide powder is mixed in it, the utilization factor of active material is 95% or more. Therefore, a nickel electrode having an energy density as high as 550 to 600 mAh can be produced by the simple manufacturing process. Zinc formed solid solution in crystal of nickel hydroxide powder is active to control the swelling of nickel electrode in the same way as the conventional cadmium, and is more excellent in durability of its effect. Moreover, the nickel electrode is completely free from pollution because it includes no cadmium.

The above metal hydride electrode and the above nickel electrode are used in the nickel-hydrogen battery of this invention, so that its capacity is larger than conventional one and completely free from pollution.

BRIEF DESCRIPTION OF DRAWINGS

FIG. 3 is a diagram showing capacity-cycle characteristics of electrodes of embodiment 2.

BEST MODE FOR CARRYING OUT THE INVENTION (Embodiment 1)

Mm (misch metal) forming a mixture of rare earth elements and each element of Ni, Al, Fe, Cu were molten in a high-frequency induction heat furnace, so that a hydrogen absorbing alloy having a component range of $MmNi_{3.7}Al_{0.9}Fe_{0.3}Cu_{0.1}$ was prepared. This alloy was subjected to heat treatment under an atmosphere of argon and then ground to 200 meshes or less so that hydrogen absorbing alloy powder was prepared. 10 weight percents of simple cobalt powder (including average grain size of 1 to 15 microns) were added to and mixed with the hydrogen absorbing alloy powder, and this mixed powder was then formed into a paste using 3 weight percents of aqueous solution of polyvinyl alcohol. This paste was then loaded in a nickel fiber porous substrate having a porocity of 95% and dried in vacuum atmosphere, and then pressurized to prepare a metal hydride electrode (A0).

In place of using the foregoing cobalt powder, a (no-addition) electrode (B0) added with nothing, an electrode (C0) added with 10 weight percents of simple copper powder, an electrode (D0) added with 10 weight percents of simple nickel powder, an electrode (E0) added with 10 weight percents of graphite powder and an electrode (F0) coated with 10 weight percents of simple nickel were prepared for comparison examples in the same way as the above.

Using these metal hydride electrodes (A0) through (F0) as a negative electrode and a nickel electrode having a capacity larger than the negative electrode as a counter electrode, charging and discharging were carried out in KOH electrolyte having a specific gravity of 1.24 so as to measure an electrochemical capacity of the metal hydride electrode. The charging was conducted at 0.1 C up to 150%, and the discharging was conducted at 0.2 C up to 1 V of battery voltage.

Figure 1:
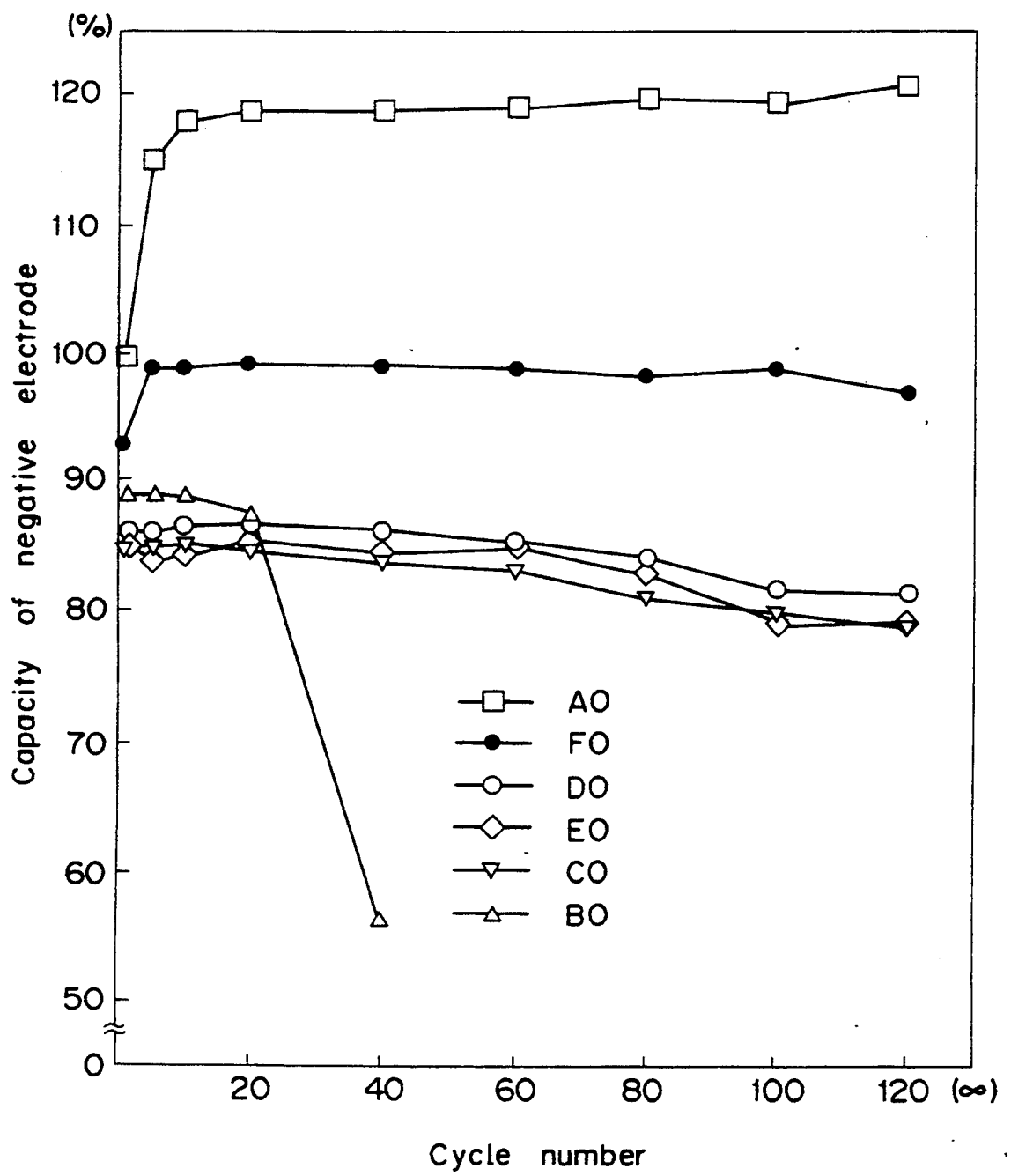
FIG. 1 is a diagram showing capacity-cycle characteristics of electrodes of embodiment 1.

Cyclic changes of electrochemical capacity (capacity-cycle characteristics) for the electrodes (A0) through (F0) are plotted in FIG. 1. In the figure, a capacity of first cycle after addition of cobalt powder is expressed as 100%.

The electrode (B0) consisting only of the hydrogen absorbing alloy developed a decrease in capacity within a short cycle. The deterioration of metal hydride electrode may be attributable to the fact that the electron transfer between alloy particles becomes impossible due to corrosion products precipitating on alloy surfaces such as a substance $La(OH)_3$ having no electric conductivity, for example.

In the electrodes (C0), (D0) and (E0), the initial capacity was similar to those of the electrode consisting only of hydrogen absorbing alloy but the decrease in capacity according to cycle was avoided. It is supposed that the added powder of simple copper, simple nickel and graphite were active to maintain the conductivity between particles after deterioration.

In the electrode (F0), since the surfaces of alloy particles were coated by nickel, the electric conductivity took effect not only after deterioration but before it, so that the utilization factor of alloy was improved and a slightly large capacity was obtained from the first cycle.

Noticeable matters of the electrode (A0) in the present invention were that its capacity was higher than those of others from the first cycle and further increased up to tenth cycle, and its cycle life was long.

Figure 2:
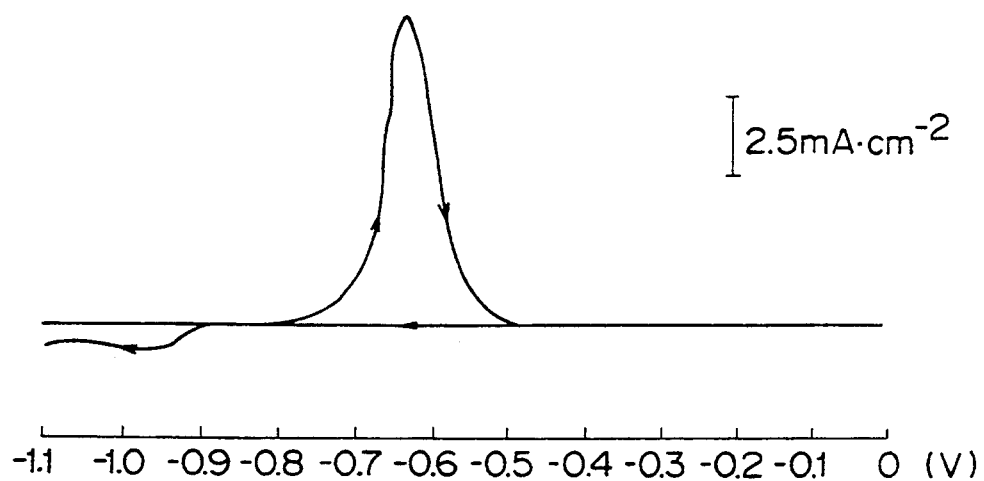
FIG. 2 is a diagram showing a cyclic voltammogram of cobalt.
Figure 4:
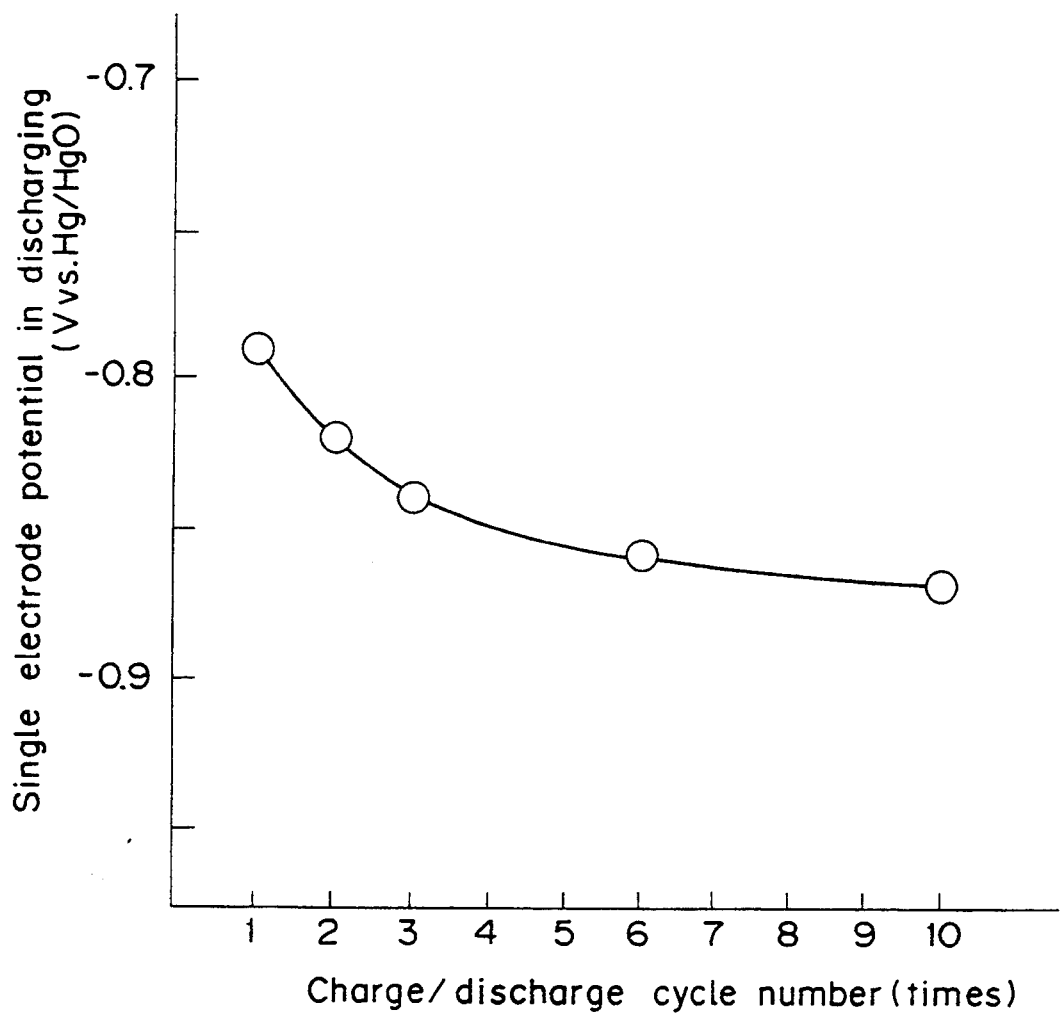
FIG. 4 is a diagram showing an average discharge voltage of electrodes of embodiment 2.

Nickel and copper maintain metal states since their potential at a battery operating exists in no-corroding domein. However, cobalt is assumed to develop the reaction expressed by equation (3) in a plate inside considering from the cyclic voltammogram of FIG. 2. It is considered that the cobalt repeats dissolution and precipitation during cycles so as to form a conductive network of cobalt while covering the hydrogen absorbing alloy powder or corrosion product.

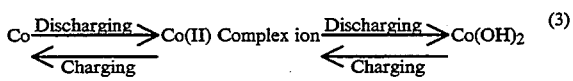

The increase of capacity in the range of first cycle to tenth cycle corresponds to the formation stage of conductive network, and means a rise of utilization factor of the hydrogen absorbing alloy. It can be considered that the elongation of cycle life is attributable to an reinforcement of conductive network owing to the repetition of cycle.

The particular highness of capacity owing to cobalt (specific highness of initial capacity) is considered to be resulted from the following fact except for the foregoing electric conductivity. The cobalt including 3d-orbital is well known to operate as an ionization catalyst of hydrogen in the hydrogen electrode. Therefore, it can be considered that the cobalt operates in a catalytic manner in the ionization process which is a rate-determining step of discharge.

Namely, it can be understood that the addition of cobalt powder is desirable to the improvement in capacity and the elongation of cycle life.

The alloy for producing the addition effect of cobalt powder is not limited to the hydrogen absorbing alloy which is formed by substituting a part of Al of $MmNi_x$-$Al_y$ with one kind of Fe, Cu, Co and Mn, i.e. by substituting a part of Ni of $MmNi_5$ with Al and one kind of Fe, Cu, Co and Mn. But the effect may also be produced by hydrogen absorbing alloys having a general equation of $AB_xC_y$ (A: Any one of Mm, Y, Ti, Hf, Zr, Ca, Th, La; B: Two or more kinds of Ni, Co, Cu, Fe, Mn; C: Any one of Al, Cr, Si) and Laves phase alloy system (Zr-Mn system, Zr-Ni system, Zr-La system, Ti-Ni system, Mg-Ni system) etc.

An example of using the nickel porous substrate is described in this embodiment. The present invention is not limited to this structure, however, an expanded metal, meshed metal and nickel plated punched metal etc. may be used for the substrate.

Further, the same effect will be obtainable when powder of cobalt compound or powder of cobalt including alloy, which is soluble in alkaline electrolyte and can produce cobalt complex ion, is added in place of the simple cobalt powder.

(Embodiment 2)

A hydrogen absorbing alloy $MmNi_{3.7}Al_{0.5}Fe_{0.7}Cu_{0.1}$ was prepared by using Mm (principal components: Ce; 50 weight percents, La; 28 weight percents, Nd; 16 weight percents) in the same way as the embodiment 1. Then, a metal hydride electrode (A1) was prepared by using this alloy in the same way as the electrode (A0) of embodiment 1.

While, an electrode (B1) with no addition, an electrode (C1) comprising a microencapsulated alloy coated with 20 weight percents of simple nickel, and an electrode (D1) comprising an alloy added with 20 weight percents of simple nickel powder as a conductive agent were prepared for comparison examples in the same way.

FIG. 3 shows capacity-cycle characteristics of the electrodes (A1) through (D1). As seen from FIG. 3, in the electrode (A1) of this embodiment, it can be understood that the capacity increased at an initial stage of charge/discharge cycle and the decrease in capacity according to cycle was avoided thereafter. An average discharge voltage shifted to the minus side with an increase in charge/discharge cycle number so that the over-voltage at time of the discharge reaction lowered. On the contrary, in case of the electrode (D1) of comparison example, the capacity increasing effect at the initial stage as observed in the electrode (A1) was not recognized although the decrease in capacity with an increase in cycle number did not occur. In cases of the electrodes (B1) and (C1), gradual decreases in capacity took place.

In the electrode (A1), it can be considered that behavior of cobalt is similar to that of the embodiment 1. While, in the electrodes (B1) and (C1), it can be considered that the electron conductivity decreased to inhibit the discharge reaction with a progress of corrosion on alloy surface so that the capacity was decreased, because a large quantity of hydrogen was still included in these electrodes.

As described above, the electrode (A1) is simple in manufacture and excellent in cycle performance because it is only added to and mixed with cobalt powder.

The similar effect will be obtainable when powder of cobalt compound or powder of cobalt including alloy soluble in alkaline electrolyte is added in place of the simple cobalt powder.

The kind of alloy producing the addition effect of cobalt powder and the kind of porous substrate used are similar to those of the embodiment 1.

(Embodiment 3)

A metal hydride electrode (A2) was prepared in the same way as the electrode (A0) of embodiment 1 except for the simple cobalt which was replaced by cobalt monoxide. An electrode (B2) with no addition, an electrode (C2) added with 10 weight percents of simple copper powder, an electrode (D2) added with 10 weight percents of simple nickel powder, an electrode (E2) added with 10 weight percents of graphite powder, and an electrode (F2) coated with 10 weight percents of simple nickel were prepared for comparison examples in the same way as embodiment 1. Capacity-cycle characteristics were compared between the electrode (A2) and the others.

Figure 5:
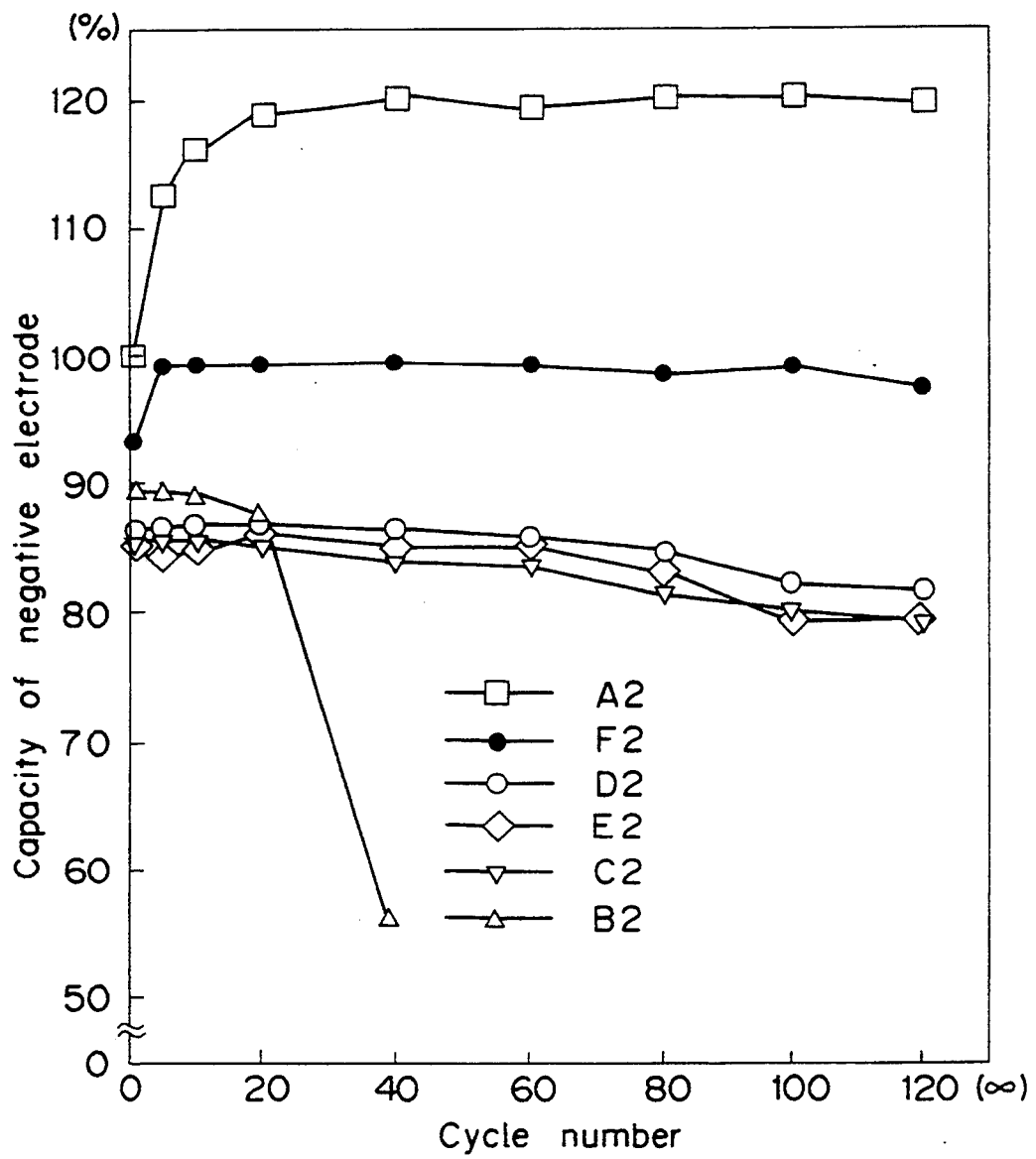
FIG. 5 is a diagram showing capacity-cycle characteristics of electrodes of embodiment 3.

FIG. 5 shows capacity-cycle characteristics of the electrodes (A2) through (F2). Characteristics of the electrodes (B2) through (F2) of comparison examples were similar to those of the embodiment 1. In the electrode (A2) added with cobalt monoxide powder of this embodiment, its capacity was higher than those of others from the first cycle and further increased up to fifteenth cycle, and its cycle life was also long.

The behavior of cobalt monoxide can be considered as similar to that of the simple cobalt of embodiment 1. The increase in capacity from first cycle to fifteenth cycle will correspond to a formation stage of conductive network by cobalt.

As described above, the capacity can be improved and the cycle life can be prolonged in the same way as the embodiment 1 even when cobalt monoxide powder is added.

The similar effect will be obtainable when other cobalt oxides or cobalt hydroxides such as $Co_3O_4$ or $Co(OH)_3$, for example, is added in place of the cobalt monoxide.

The kind of alloy producing the addition effect of cobalt monoxide powder and the kind of porous substrate used are similar to those of the embodiment 1.

(Embodiment 4)

A hydrogen absorbing alloy $MmNi_{3.7}Al_{0.5}Fe_{0.7}Cu_{0.1}$ was prepared by using Mm (principal components: Ce; 50 weight percents, La; 28 weight percents, Nd; 16 weight percents) in the same way as the embodiment 1. Then, a hydrogen absorbing alloy powder was prepared.

5 weight percents of simple cobalt powder (including average grain size of 1 to 15 microns) and 5 weight percents of simple copper powder were added to and mixed with the hydrogen absorbing alloy powder to prepare a metal hydride electrode (A3) in the same way as embodiment 1.

While, in place of using the above cobalt powder and copper powder; an electrode (B3) with no addition, an electrode (C3) added with 20 weight percents of simple copper powder, and a microencapsulated electrode (D3) coated with 20 weight percents of simple copper were prepared for comparison examples in the same way.

Electrochemical capacities of these metal hydride electrodes (A3) through (D3) were measured in the same way as embodiment 1. The charging was conducted at 0.1 C up to 150%, and the discharging was conducted at 0.2 C up to –0.5 V (against mercury oxide electrode) of metal hydride electrode potential.

Figure 6:
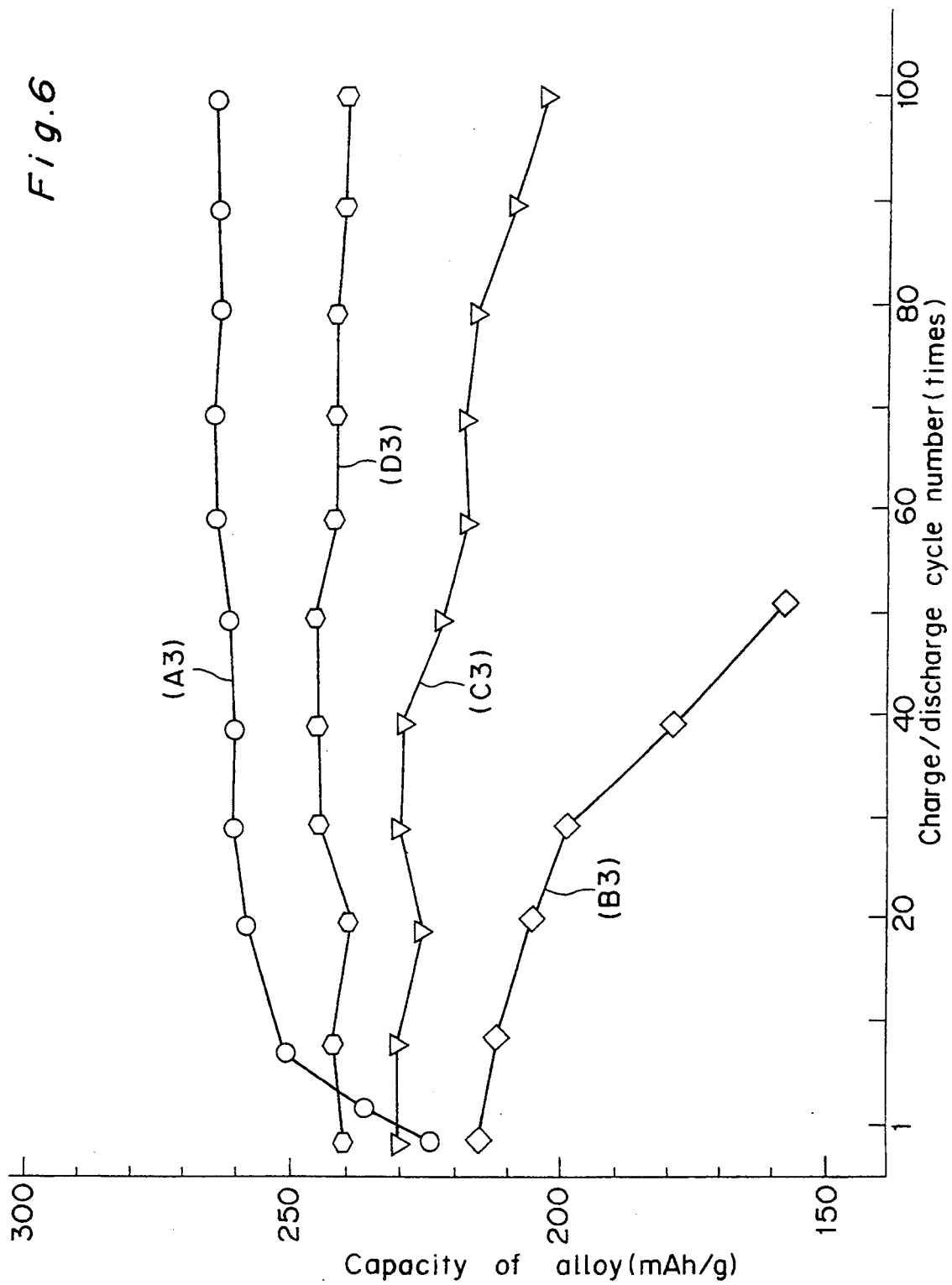
FIG. 6 is a diagram showing capacity-cycle characteristics of electrodes of embodiment 4.

Capacity-cycle characteristics of the electrodes (A3) through (D3) are plotted in FIG. 6. In the electrode (A3) of this embodiment, its capacity increased at initial stage of charge/discharge cycle and the decrease in capacity was prevented thereafter without decreasing the electronic conductivity in the same way as the electrode (D3). While, in the electrodes (B3) and (C3), their resistances gradually increased (electronic conductivities decreased) to decrease the capacities.

It can be considered that behavior of cobalt in the electrode (A3) is similar to that of the embodiment 1. Further, it can be supposed that the existence of copper powder excellent in electric conductivity is helpful to maintain a higher electric conductivity.

In the electrode (A3), the total amount of electrochemically useless addition agent is 10 weight percents so that the decrease in capacity can be prevented by a smaller amount than the electrodes (C3) and (D3) of comparison examples. Accordingly, a capacity per unit weight of active material is increased by about 10%.

The above effect can be recognized in a range of an addition amount of 3 weight percents or more for the cobalt powder and in a range of addition amount of 5 weight percents or more for the copper powder. However, when these addition amounts increase to 10 weight percents or more respectively, the capacity per unit weight of active material of electrode becomes small so that these addition amounts are not appropriate from the practical standpoint.

The similar effect will be obtainable when powder of cobalt compound or powder of cobalt including alloy soluble in alkaline electrolyte is added in place of the simple cobalt powder.

The kind of alloy producing the addition effect of cobalt powder and copper powder and the kind of porous substrate used are similar to those of the embodiment 1.

(Embodiment 5)

A hydrogen absorbing alloy $MmNi_{3.7}Al_{0.5}Fe_{0.7}Cu_{0.1}$ was prepared by using Mm (principal components: Ce; 50 weight percents, La; 28 weight percents, Nd; 16 weight percents) in the same way as the embodiment 1. Then, a hydrogen absorbing alloy powder was prepared.

A nickel plating was carried out on surfaces of the hydrogen absorbing alloy powder using 5 weight percents of simple nickel by means of an electroless plating method. Further, 5 weight percents of simple cobalt powder (including average grain size of 1 to 15 microns) were added to and mixed with the above powder to prepare a metal hydride electrode (A4) in the same way as the embodiment 1.

While, in place of using the above nickel plating and addition of cobalt powder, an electrode (B4) with no addition, an electrode (C4) added with 20 weight percents of nickel powder, and a microencapsulated electrode (D4) plated with 20 weight percents of nickel were prepared for comparison examples in the same way.

Electrochemical capacities of these metal hydride electrodes (A4) through (D4) were measured in the same way as embodiment 4.

Figure 7:
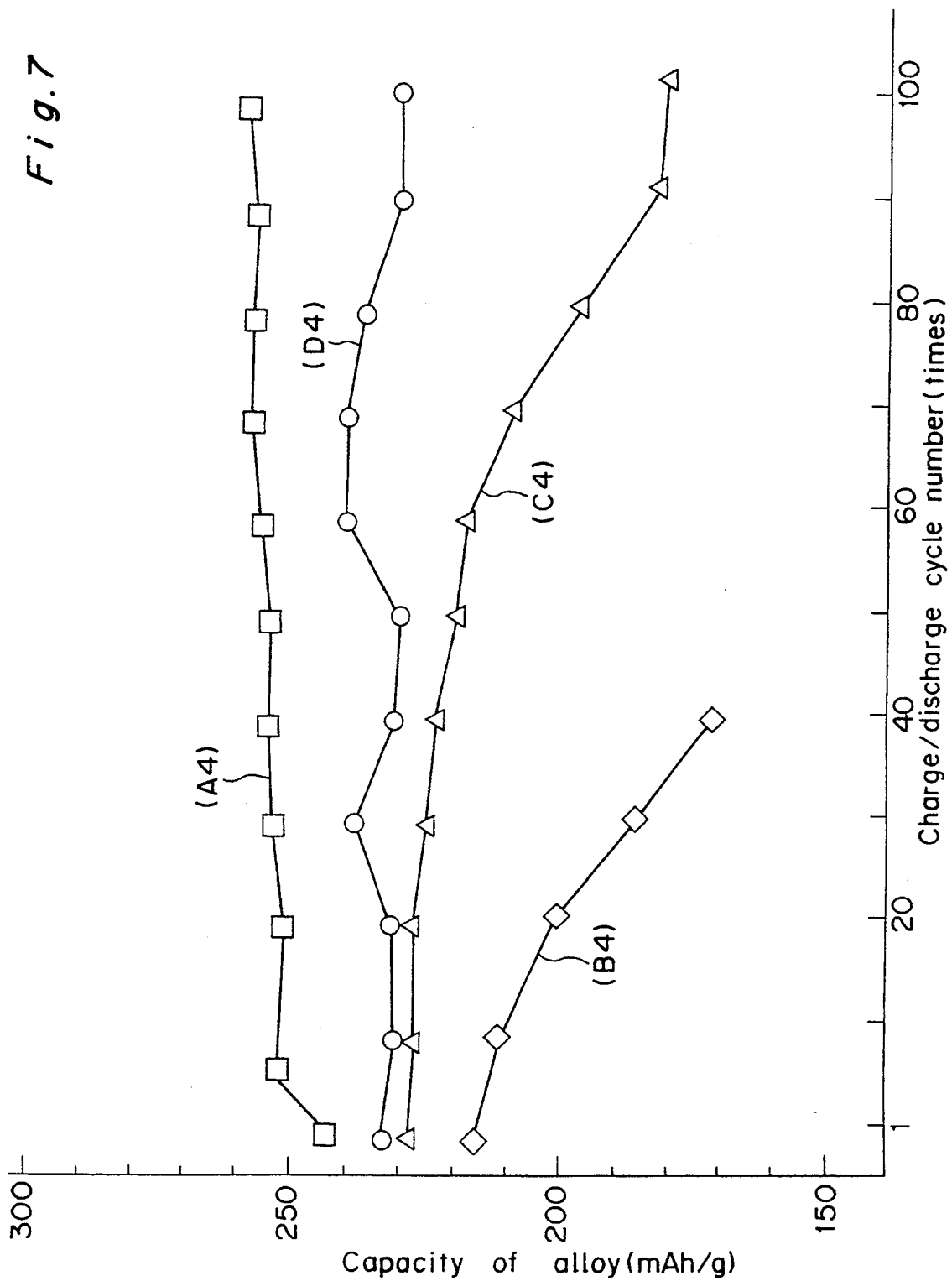
FIG. 7 is a diagram showing capacity-cycle characteristics of electrodes of embodiment 5.

Capacity-cycle characteristics of the electrodes (A4) through (D4) are plotted in FIG. 7. In the electrode (A4) of this embodiment, its capacity increased simultaneously with the decrease in resistance of the electrode at initial stage of charge/discharge cycle and the decrease in capacity was thereafter prevented in the same way as the electrode (D4). While, in the electrodes (D4), such an effect of increase in capacity at initial stage can not be recognized. In the electrodes (B4) and (C4), their resistances gradually increased (electronic conductivities decreased) to decrease the capacities.

It can be considered that behavior of cobalt in the electrode (A4) was similar to that of the embodiment 1. Further, the cobalt together with the nickel coated on alloy surfaces operated as a catalyst for ionization reaction of hydrogen expressed by the above equation (3). As a result, it can be supposed that not only the elongation of cycle life but the increase in electrode capacity were attained.

In the electrode (A4), the total amount of electrochemically useless addition agent is 10 weight percents which are smaller than those of the electrodes (C4) and (D4) of comparison examples so that the capacity per unit weight of active material is increased by 10% or more in addition to the above effect of increase in capacity.

The above effect can be recognized in a range of an addition amount of 3 weight percents or more for the cobalt powder and in a range of coating amount of 1 weight percent or more for the nickel to alloy surfaces. However, when these addition and coating amounts increase to 10 weight percents or more respectively, the capacity per unit weight of active material of electrode becomes small so that these addition and coating amounts are not appropriate from the practical standpoint.

The similar effect will be obtainable when powder of cobalt compound or powder of cobalt including alloy soluble in alkaline electrolyte is added in place of the simple cobalt powder.

The kind of alloy producing the effect of nickel plating or addition of cobalt powder and the kind of porous substrate used are similar to those of the embodiment 1.

(Embodiment 6)

A hydrogen absorbing alloy $MmNi_{3.7}Al_{0.5}Fe_{0.7}Cu_{0.1}$ was prepared by using Mm (principal components: Ce; 50 weight percents, La; 28 weight percents, Nd; 16 weight percents) in the same way as embodiment 1. Then, a hydrogen absorbing alloy powder was prepared.

5 weight percents of simple cobalt powder (including average grain size of 1 to 15 microns) and 5 weight percents of simple nickel powder were added to and mixed with the hydrogen absorbing alloy powder to prepare a metal hydride electrode (A5) in the same way as the embodiment 1.

While in place of using the above cobalt powder and nickel powder, an electrode (B5) with no addition, an electrode (C5) added with 20 weight percents of simple nickel powder, and a microencapsulated electrode (D5) plated with 20 weight percents of simple nickel were prepared for comparison examples in the same way.

Electrochemical capacities of these metal hydride electrodes (A5) through (D5) were measured in the same way as embodiment 4.

Figure 8:
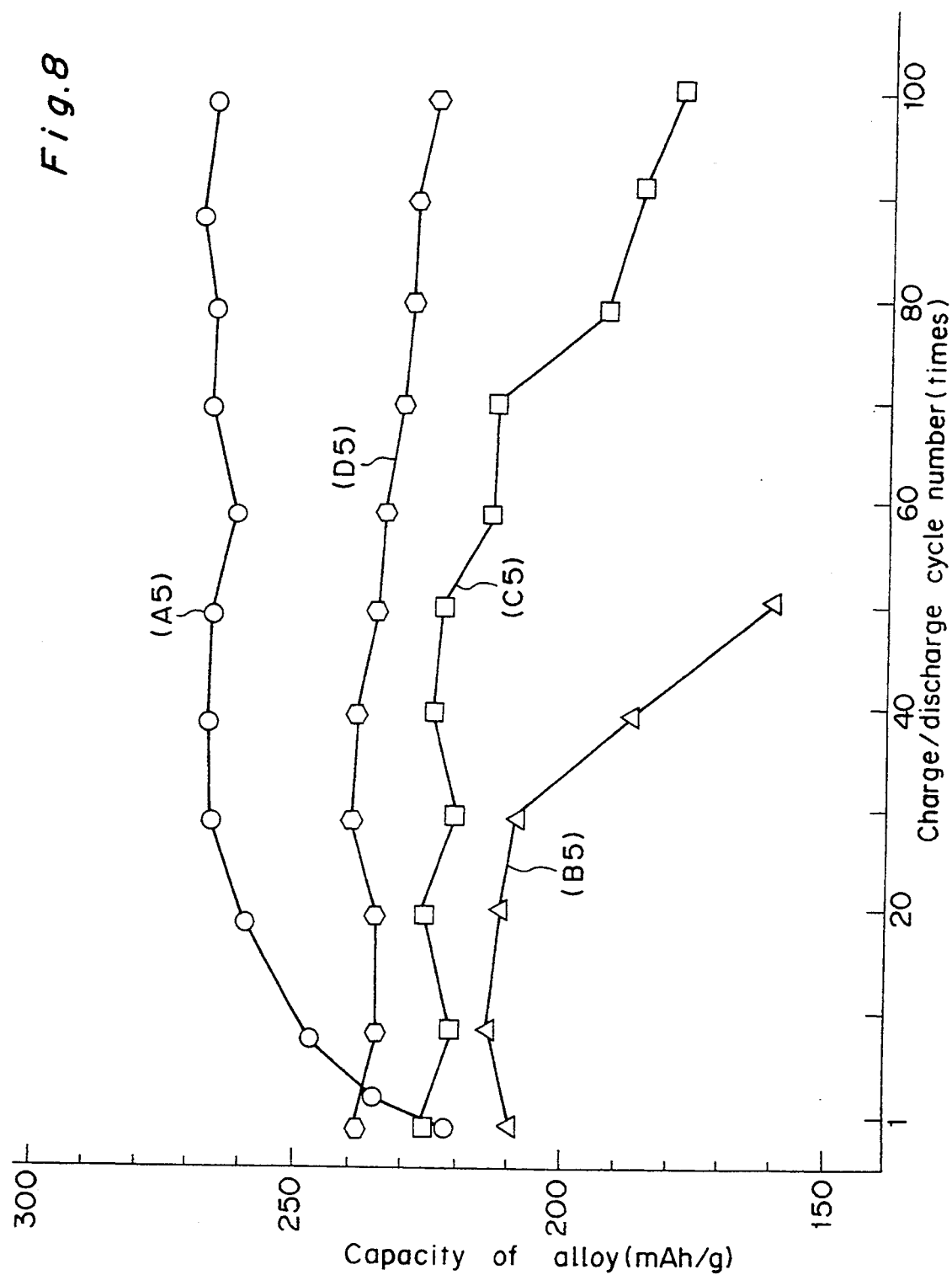
FIG. 8 is a diagram showing capacity-cycle characteristics of electrodes of embodiment 6.

Capacity-cycle characteristics of the electrodes (A5) through (D5) are plotted in FIG. 8. In the electrode (A5) of this embodiment, its capacity increased at initial stage of charge/discharge cycle and the decrease in capacity was prevented thereafter without decreasing the electronic conductivity in the same way as the electrode (D5). While, in the electrodes (B5) and (C5), their resistances gradually increased (electronic conductivities decreased) to decrease their capacities.

It can be considered that the behavior of cobalt in the electrode (A5) is similar to that of the embodiment 1. Further, it can be supposed that the cobalt and the nickel, which forms a transition metal having d-electron, operate in synergetic manner as a catalyst for ionization reaction of hydrogen expressed by the equation (3). Moreover, in the sealed type nickel-hydrogen battery, the added nickel operates also as a catalyst for reducing reaction of oxygen, which is generated from the positive electrode at time of overcharge, on the negative electrode.

In the electrode (A5), the total amount of electrochemically useless addition agent is 10 weight percents so that the decrease in capacity is prevented by a smaller amount than the electrodes (C5) and (D5) of comparison examples. Accordingly, a capacity per unit weight of active material is increased by about 10%.

The above effect can be recognized in a range of an addition amount of 3 weight percents or more for the cobalt powder and in a range of addition amount of 5 weight percents or more for the nickel powder. However, when these addition amounts increase to 10 weight percents or more respectively, the capacity per unit weight of active material of electrode becomes small so that these addition amounts are not appropriate from the practical standpoint.

The similar effect will be obtainable when powder of cobalt compound or powder of cobalt including alloy soluble in alkaline electrolyte is added in place of the simple cobalt powder.

The kind of alloy producing the addition effect of cobalt powder and nickel powder and the kind of porous substrate used are similar to those of the embodiment 1.

(Embodiment 7)

Ammonia was added to aqueous solution prepared by solving zinc sulfate of 3 to 8 weight percents into nickel sulfate so as to form nickel-ammine complex ion, and aqueous solution of sodium hydroxide was added dropwise to the above solution while violently stirring it so that nickel hydroxide powder was synthesized in which a solid solution of zinc was formed.

The nickel hydroxide powder thus obtained was forming high-density spherical particles having an inner pore volume (0.05 ml/g) being about a fifth of that (0.15 ml/g) of conventional particles, and its tapping density (bulk density) was 2.0 g/ml larger than that (1.6 g/ml) of conventional powder. As the result, it became possible to increase the loading capacity by about 20 % as compared with the conventional one.

Further, the zinc forming the solid solution in the crystal of nickel hydroxide powder was effectively active to prevent formation of γ-NiOOH causing the swelling of electrode (increase in thickness of electrode) in a range of 2 weight percents or more and a persistency of this effect was more excellent than that of cadmium. Since an increase in quantity of zinc will decrease a content of nickel hydroxide, its adding amount is preferably 2 to 8 weight percents from the view point of practical use.

Cobalt monoxide powder was mixed to high-density nickel hydroxide powder and formed into a paste using aqueous solution of CMC (carboxymethylcellulose) thereafter. This paste was loaded in a nickel fiber porous substrate including a porocity of 95 %, and dried and pressurized to prepare a nickel electrode.

The cobalt monoxide powder coated surfaces of nickel hydroxide particles in the electrolyte through means of chemical dissolution and precipitation reaction expressed by the equation (4), and it changed to conductive CoOOH at time of the initial charge so as to form the conductive network between nickel hydroxide particles and current collecting bodies. Thus, it was active to improve the utilization factor of active material up to 95 through 100%. Here, an important fact is that the cobalt is dispersed uniformly over the entire electrode through means of the reaction expressed by equation (4). For that purpose, it is necessary to leave the electrode in the electrolyte solution for 5 hours or more.

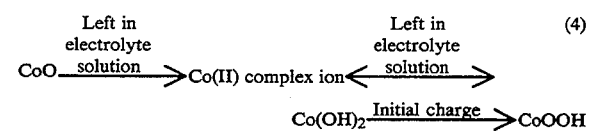

Figure 9:
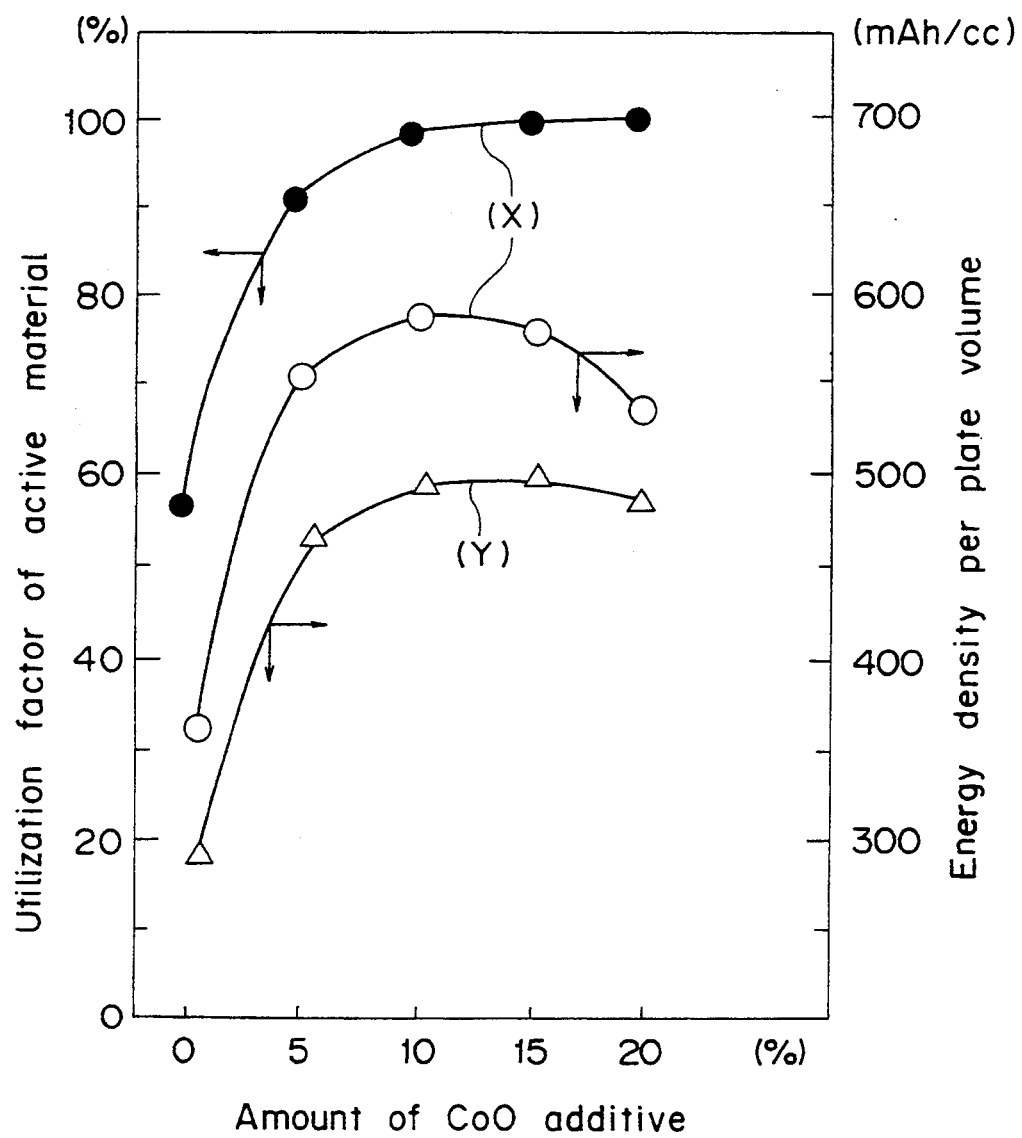
FIG. 9 is a diagram showing capacities of a nickel electrode of embodiment 7 and a conventional nickel electrode.

Capacities of the nickel electrode (X) thus prepared and the conventional one (Y) using conventional nickel hydroxide powder are shown in FIG. 9. It can be understood from this diagram that a proper range of the addition amount of cobalt monoxide is 2 to 15 weight percents, and that the capacity of the electrode (X) of this embodiment can be improved up to 600 mAh/cc which is about 1.2 time as large as the conventional electrode (Y).

It can be further understood that, in the nickel electrode (X), the utilization factor of active material increases but the energy density decreases when the addition amount of cobalt monoxide exceeds 15 weight percents.

As described above, the nickel electrode of this embodiment is free from pollution because it does not include cadmium, and has a high energy density.

An example of using the nickel fiber porous substrate is described in this embodiment. The present invention is not limited to this structure, however, an expanded metal, meshed metal and nickel plated punched metal etc. may be used for the substrate.

(Embodiment 8)

The metal hydride electrode of the embodiment 2 and the nickel electrode of the embodiment 7 were wound each other with separator made of nylon non-woven fabric put between them, and aqueous solution of potassium hydroxide having a specific gravity of 1.24 was filled therein, so that AA sized cylindrical sealed-type nickel-metal hydride battery was prepared. The battery was maintained under standing condition for 5 hours or more after filled with solution and sealed, and then initial charging of battery was conducted for the reason described in the embodiment 7.

Figure 10:
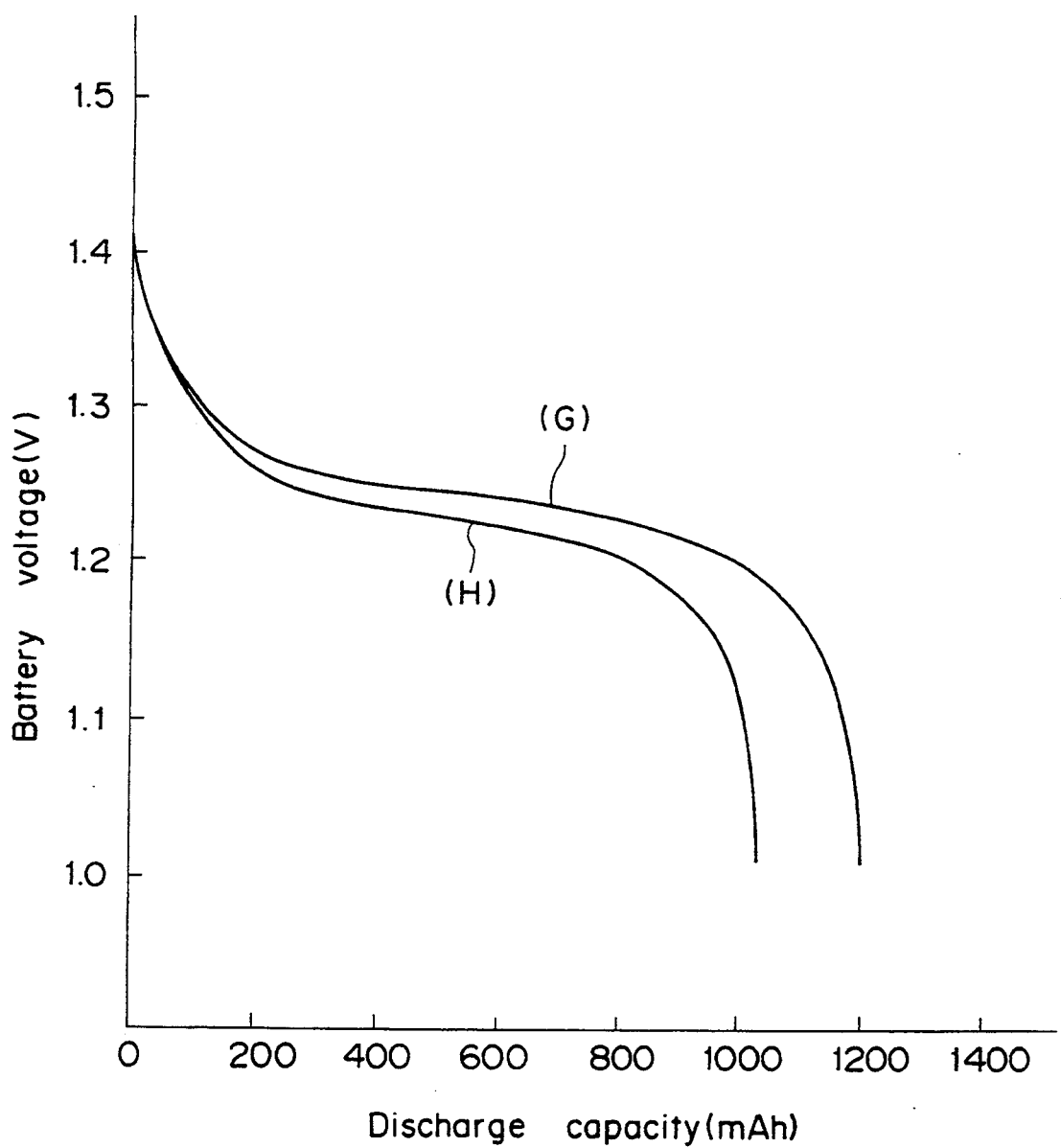
FIG. 10 is a diagram showing discharge characteristics of a nickel-hydrogen battery of embodiment 8 and a conventional battery.
Figure 11:
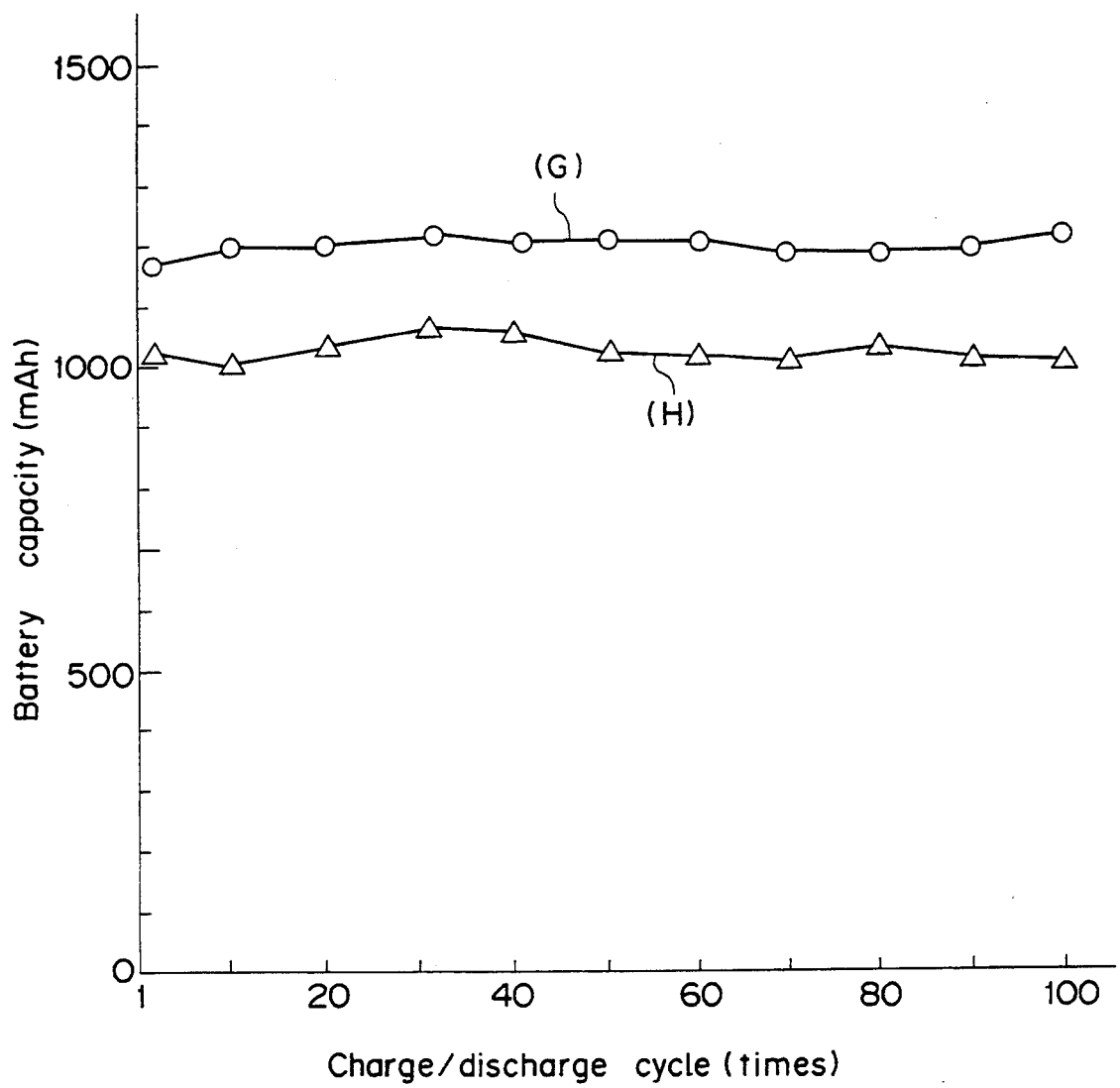
FIG. 11 is a diagram showing capacity-cycle characteristics of the nickel-hydrogen battery of embodiment 8 and the conventional battery.

Discharge characteristic of the battery thus prepared is plotted in FIG. 10, and its capacity-cycle characteristic is plotted in FIG. 11. Charging and discharging of FIG. 11 was carried out at 20° C. charging was carried out at 0.3 C for 5 hours and discharging was carried out at 0.5 C up to 1 V of battery voltage. It can be understood from these figures that the battery (G) of this embodiment has a capacity of about 1.2 times as large as the conventional battery (H), and is excellent in cycle characteristic.

As described above, the nickel-hydrogen battery of this embodiment has a high energy density as compared with conventional one, is free from pollution because it does not include cadmium, and its manufacturing process is simple and inexpensive.

What is claimed is:

1. A metal hydride electrode, in which a powder of cobalt constituent containing material is mixed with a powder of a hydrogen absorbing alloy within a mixing range of 3 to 20 wt %, the hydrogen absorbing alloy being formed by substituting a part of the Ni of a powder of an alloy expressed by the formula MmNi$_5$ with Al and at least one member selected from the group consisting of Fe, Cu, Co and Mn, said mixed powder is loaded in a porous alkaline-proof metal body and subjected to a charge/discharge reaction so as to dissolve and precipitate a cobalt constituent from said cobalt constituent containing material, and a surface layer comprising the cobalt constituent is formed on said powder of hydrogen absorbing alloy.

2. A metal hydride electrode as set forth in claim 1, in which the cobalt constituent containing material is at least one member selected from the group consisting of elemental cobalt, a cobalt compound and a cobalt containing alloy.

3. A metal hydride electrode as set forth in claim 2, in which the cobalt compound is a cobalt monoxide.

4. A metal hydride electrode as set forth in claim 1, in which the hydrogen absorbing alloy is $MmNi_{3.7}Al_{x-}M_yN_z$ (M: Fe or Mn, N: Cu or Co, $0.3 \leq x \leq 0.9$; $0.1 \leq y \leq 0.9$; $0.1 \leq z \leq 0.9$).

5. A metal hydride electrode, in which a powder of elemental copper is mixed with a powder of a hydrogen absorbing alloy within a mixing range of 5 to 10 wt % and a cobalt constituent containing material is mixed therewith within a mixing range of 3 to 10 wt %, the hydrogen absorbing alloy being formed by substituting a part of the Ni of a powder of an alloy expressed by the formula $MmNi_5$ with Al and at least one member selected from the group consisting of Fe, Cu, Co and Mn, said mixed powder is loaded in a porous alkaline-proof metal body and subjected to a charge/discharge reaction so as to dissolve and precipitate a cobalt constituent from said cobalt constituent containing material, and a surface layer comprising the cobalt constituent is formed on said powder of hydrogen absorbing alloy.

6. A metal hydride electrode, in which a surface of a powder of a hydrogen absorbing alloy is coated with an elemental nickel within a range of 1 to 10 wt %, the hydrogen absorbing alloy being formed by substituting a part of the Ni of a powder of an alloy expressed by formula of $MmNi_5$ with Al and at least one member selected from the group consisting of Fe, Cu, Co and Mn, said powder is mixed with a powder of a cobalt constituent containing material within a rage of 3 to 10 wt %, said mixed powder is loaded in a porous alkaline-proof metal body and subjected to a charge/discharge reaction so as to dissolve and precipitate a cobalt constituent from said cobalt constituent containing material, and a surface layer comprising the cobalt constituent is formed on said powder of hydrogen absorbing alloy coated with elemental nickel.

7. A metal hydride electrode, in which a powder of elemental nickel is mixed with a powder of hydrogen absorbing alloy within a mixing range of 5 to 10 wt % and a powder of cobalt constituent containing material is mixed therewith within a mixing range of 3 to 10 wt %, the hydrogen absorbing alloy being formed by substituting a part of Ni of an alloy powder of an alloy expressed by a formula of $MmNi_5$ wherein part of the Ni is substituted with Al and at least one member selected from the group consisting of Fe, Cu, Co and Mn, said mixed powder is loaded in a porous alkaline-proof metal body and subjected to a charge/discharge reaction so as to dissolve and precipitate a cobalt constituent from said cobalt constituent containing material, and a surface layer comprising the cobalt constituent is formed on said powder of hydrogen absorbing alloy.

8. A metal hydride electrode as set forth in claim 5, in which the cobalt constituent containing material is at least one member selected from the group consisting of elemental cobalt, a cobalt compound and a cobalt containing alloy.

9. A metal hydride electrode as set forth in claim 6, in which the cobalt constituent containing material is at least one member selected from the group consisting of elemental cobalt, a cobalt compound and a cobalt containing alloy.

10. A metal hydride electrode as set forth in claim in which the cobalt constituent containing material is at least one member selected from the group consisting of elemental cobalt, a cobalt compound and a cobalt containing alloy.

* * * * *